United States Patent
Beeren

(10) Patent No.: US 7,636,140 B2
(45) Date of Patent: Dec. 22, 2009

(54) METHOD TO OPTIMIZE THE COLOR POINT IN TRANSFLECTIVE COLOR LIQUID CRYSTAL DISPLAYS

(75) Inventor: Rudolf Jozef Marie Beeren, Heerlen (NL)

(73) Assignee: Tpo Hong Kong Holding Limited, Shatin, Hong Kong Sar (CN)

( * ) Notice: Subject to any disclaimer, the term of this patent is extended or adjusted under 35 U.S.C. 154(b) by 372 days.

(21) Appl. No.: 10/591,019

(22) PCT Filed: Feb. 23, 2005

(86) PCT No.: PCT/IB2005/050663

§ 371 (c)(1),
(2), (4) Date: Aug. 28, 2006

(87) PCT Pub. No.: WO2005/085942

PCT Pub. Date: Sep. 15, 2005

(65) Prior Publication Data

US 2008/0198313 A1    Aug. 21, 2008

(51) Int. Cl.
*G02F 1/1335* (2006.01)
(52) U.S. Cl. .................... 349/107; 349/106
(58) Field of Classification Search .......... None
See application file for complete search history.

(56) References Cited

U.S. PATENT DOCUMENTS 6,078,370 A * 6/2000 Wang et al. .............. 349/75
2003/0184694 A1* 10/2003 Chang et al. ............. 349/113

FOREIGN PATENT DOCUMENTS

EP    1279996    1/2003
EP    1357421    10/2003

OTHER PUBLICATIONS

PCT International Search Report of Counterpart PCT Application No. PCT/IB2005/050663, Jun. 27, 2005.

* cited by examiner

*Primary Examiner*—Sung H Pak
(74) *Attorney, Agent, or Firm*—Liu & Liu

(57) ABSTRACT

The present invention relates to transflective color liquid crystal displays that provide for improved balancing and optimization of color and white points in transmissive and reflective mode. The invention is base on the deliberate increase of light absorbance at sub-pixels of selected colors. The light absorbance can be increased by the inclusion of light absorbing portions (803) on the transflector (800) at sub-pixel level, which then reduces the total reflectivity and/or transmittivity of that sub-pixel. Selecting the light absorbance in accordance with the present invention may be combined with the use of color filters having differentiated thickness and/or pinhole color filters.

20 Claims, 3 Drawing Sheets

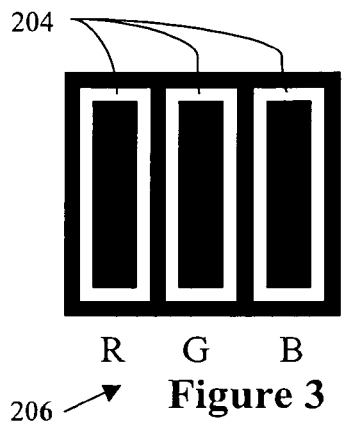
Figure 3
Figure 4
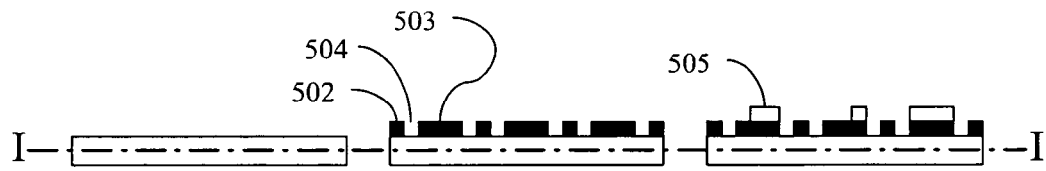
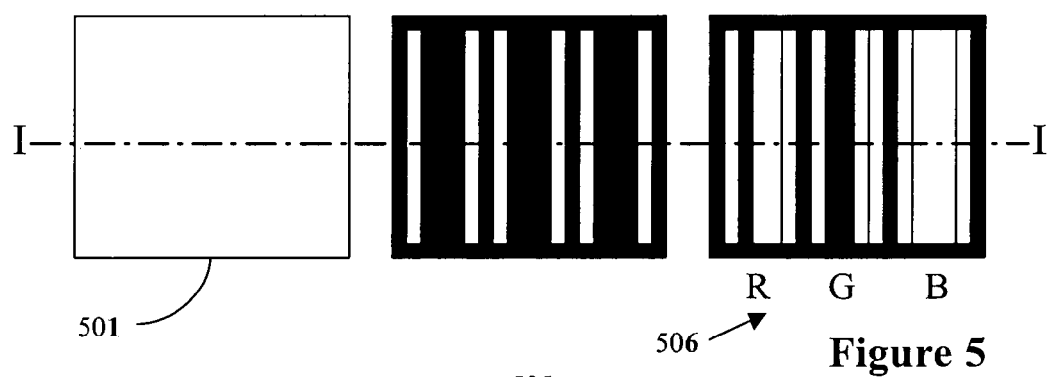
Figure 5
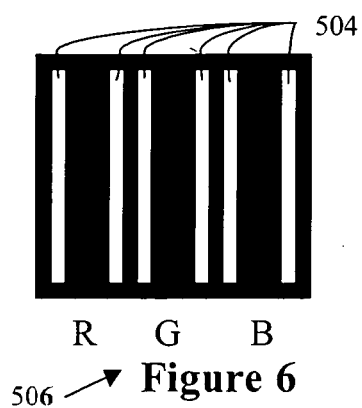
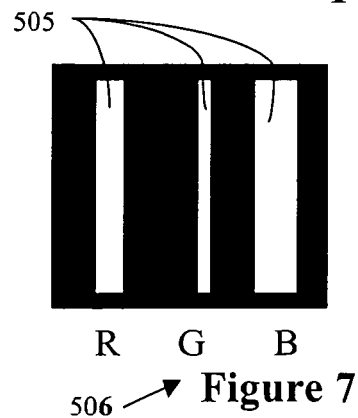
Figure 6
Figure 7

METHOD TO OPTIMIZE THE COLOR POINT IN TRANSFLECTIVE COLOR LIQUID CRYSTAL DISPLAYS

FIELD OF THE INVENTION

The present invention relates to transflective liquid crystal color displays that exhibit an improved color saturation and white point accuracy.

TECHNICAL BACKGROUND

Flat panel displays is a rapidly increasing field. Liquid crystal displays are the most widespread example, and they are currently subject for rapid development.

Transflective liquid crystal displays (LCDs) are characterized by their ability to provide reflective properties, illuminated by ambient light, as well as transmissive properties, illuminated by an internal backlight arrangement. Such displays are advantageous in that they exhibit high readability in bright daylight as well as in dark surroundings.

The transflective property is provided by a transflector that is arranged between the liquid crystal layer and the backlight. The most common transflector is the so-called "hole-in-mirror" type transflector, which is basically a perforated mirror having reflecting portions and transmissive portions (i.e. holes). Transflectors are generally classified by their reflection/transmission ratio, e.g. a 90/10 transflector have 90% reflective surface and 10% transmissive surface.

A transflective display can thus be driven in either of a purely reflective mode, having the backlight turned off, or a transmissive mode, having the backlight turned on. However, ambient light can be exploited even when the backlight is turned on. In such case a combination of transmitted and reflected light is exploited and displayed.

Most transflective liquid crystal displays are full-color displays, and thus feature a color filter. The color filter is typically a patterned RGB filter (Red, Green, and Blue), and the color patterning coincides with a sub-pixel arrangement in the liquid crystal element. RGB filters are additive in that they transmit only one color (R, G, or B) and absorb the remaining colors. Hues are thus formed by combining (adding) light from two or three sub-pixels. Mixing all three colors, of course, forms white light. Due to the absorbing nature of the color filters, brightness is a critical issue in full color displays.

A transflective display is thus arranged with a layer of liquid crystal (the LC layer), a color filter, and a transflector. Ambient light that impinges the display travels through the LC layer and the color filter, is reflected by the transflector (except for the fraction of light that is transmitted through the transflector), and returns back through the LC layer and the color filter. In the transmissive mode, light originates in the backlight and travels first through the transflector (i.e. the fraction of light that is not reflected by the transflector) and subsequently through the LC layer and the color filer. In effect, light originating from the backlight crosses the color filer only once whereas ambient light reflected by the reflector crosses the color filter twice resulting in an increased filtering effect and thus in a more saturated color.

Consequently, the color saturation in a transflective display typically differs between the transmissive mode and the reflective mode. This problem is further amplified by the fact that the color spectrum of the ambient light that is exploited in the reflective mode typically differs from the color spectrum of the backlight that is exploited in the transmissive mode. The resulting color differences make smooth transitions between the drive modes difficult or even impossible. Furthermore, the white point (i.e. the perceived color and intensity of the whitest possible light) typically differs between the transmissive and the reflective mode.

The color-balancing problem is further complicated by the fact that the sub-pixels have limited contrast. In other words, it is not possible to turn the sub-pixels off completely. The limited contrast thus deteriorates the color saturation, since, for example, the most reddish hue will still be deteriorated by a certain amount of green and blue light.

Consequently, the color saturation and white points in the transflective and reflective drive modes need to be improved as well as balanced.

One approach for alleviating this problem is to use a color filter that does not fully cover the reflective portions of the transflector (a so-called pin-hole color filter). Such a solution is indicated in e.g. EP1279996A2. In effect, in each sub-pixel, the reflected light consists of a filtered part that has crossed the color filter twice, and an unfiltered part that has not crossed the color filter at all. The addition of unfiltered light to the reflected light reduces the saturation, and by suitable choice of color filter coverage, the saturation can be balanced with that of the transmitted light.

Another approach is to use a color filter that has differentiated thickness for the transmissive and reflective portions (a so-called MT structure). To put it simple, the color filter thickness may be doubled in the areas that correspond to transmissive portions of the transflector, whereby the same distance is traveled by ambient light and by light originating from the backlight. Such as solution is described in, for example, EP1279966.

Still one measure that can be employed in order to balance the white points in the transmissive and reflective modes is use different reflection/transmission ratios for the different colored sub-pixels. For example, in case the transmissive white point is slightly yellowish and the reflective white point is slightly bluish, the reflection/transmission ratio for the blue sub-pixel might be reduced (i.e. increasing the transmissive portion).

However, balancing and improving the white points on one hand and balancing and improving the color saturations on the other hand are two different, but indeed interlinked problems. Thus, optimizing one feature is likely to deteriorate other features. Complete optimization of the overall display performance therefore requires many degrees of freedom in the form of independent parameters that can be tuned freely.

The measures currently available do not meet this requirement, and it is therefore an object of the present invention to provide further measures for optimizing and balancing the color saturation and white points in transflective liquid crystal displays. In addition, as a general requirement, the optimization must be feasible without involving any substantial extra costs.

SUMMARY OF THE INVENTION

The present invention thus aims at providing a transflective liquid crystal display that satisfies the above requirements. This aim is attained by a transflective display as defined in appended claim 1.

Thus, one aspect of the present invention provides a transflective display that comprises a color filter that is patterned in conformity with a plurality of differently colored sub-pixels, and a transflector having sub-pixel portions aligned with corresponding sub-pixels. In the transflector, the light absorption ratio is different for sub-pixels portions corresponding to different colors. That is, one or more transflector sub-pixel portions generally absorb more light than the other transflector sub-pixel portion(s).

The transflective display according to this aspect of the invention is thus characterized in that the transflector has a light absorbance that is locally varied in accordance with the sub-pixels corresponding to the different colors. In effect, the brightness of individual colors can be selected so as to balance the white point (i.e. the balance between the different sub-pixel colors).

Naturally, every material absorbs light to a certain extent. In a display, this inherent absorption is undesirable, and materials having an as low absorption as possible are normally selected so as to maximise light output of the display. In contrast, the present invention is based of a deliberate increase of the light absorption for sub-pixels corresponding to one or more primary colors of the display, by introducing light absorbing means into the transflector.

The light absorbance can be adjusted in the transmissive portions or in the reflective portions. This can be achieved in many different ways. One way to increase the light absorbance is to locally coat the reflective and/or transmissive portion with a 10 semitransparent coating. This may be performed using e.g. a printing technique.

However, another way of patterning the transflector is to make a fraction of the relevant sub-pixels essentially light absorbing. For example, in a sub-pixel that should have a reduced reflectivity, a fraction of the otherwise reflective portion may be essentially light absorbing instead. The total reflectivity of the non-transmissive area in that sub-pixel will then be reduced in proportion to the size of the absorbing fraction. Thus, according to one embodiment, the transflector has light absorbing portions arranged at sub-pixels of at least one color. This approach is advantageous for many applications. One advantage is that the reflectivity can be controlled accurately by selecting the area ratio between reflective and absorbing portions. Another way of interpreting this embodiment, of course, is that the transmittivity can be controlled by arranging a fraction of the otherwise transmissive portions with light absorbing material.

A transflective display typically comprises a black matrix that separates the sub-pixels from each other. The matrix is generally a grid of light absorbing material and may be arranged on the transflector. The matrix serves at least two purposes, it clearly separates the sub-pixel colors preventing optical cross talk, and it enhances the reflective contrast. In case the display carries a black matrix that is arranged on the transflector, the black matrix material may also cover a fraction of sub-pixels that should have a higher light absorbance. In effect, the same material and the same manufacturing step can be exploited for the black matrix as for the increase of absorbance, thereby simplifying manufacturing. Thus, according to one embodiment, the display further comprises a black matrix that separates the sub-pixels from each other and that is formed on said transflector and out of the same material as the absorbing fraction of sub-pixels having increased light absorbance.

The conception "color point" will be used herein as a parameter for indicating brightness and saturation of the respective color. High saturation, of course, indicates that the color is "pure" in the sense that the light spectrum contains only desired wavelengths, and low saturation indicates that the light spectrum includes undesired wavelengths that deteriorates the perceived color. The conception "white point" will be used herein, in similar fashion, for indicating the brightness and whiteness of the whitest color achievable in the display. The white point, of course, is a direct function of the color points of the colors that together form the white light (e.g. the combination of the red, green, and blue color points in case of a RGB color filter).

The invention thus provides a novel measure for adjusting the white point and color point in transflective displays. However, as described above, there is a complex interrelationship between the color point and white point in transflective and reflective mode. The respective color/white points should not only be optimized to improve color saturation and whiteness, but also to balance the transmissive and reflective mode so as to provide for smooth transitions and combinations between the different drive modes. Selecting the reflectivity of sub-pixels of different color is therefore advantageously combined with other measures for improving the display performance.

Hence, according to one embodiment, an area ratio between transmissive and reflective portions of the transflector is different between sub-pixels of different colors. In effect, the reflection/transmission ratio may be individually tuned for sub-pixels of each color. For example, in case one color is too bright in transmissive mode, the reflection/transmission ratio may be increased. This would reduce the brightness in transmissive mode but would simultaneously increase the brightness in reflective mode. Unless such an increase is desirable, it may be compensated for by reducing the reflectivity of the corresponding sub-pixels in line with the present invention. Combining adjustments of the reflection/transmission ratio and the reflectivity of the non-transmissive transflector portions thus enables simultaneous optimization of the color brightness in transmissive as well as reflective mode.

Selecting the reflectivity for sub-pixels of different colors may also be combined the color filter adjustments. Hence, according to one embodiment, portions of the color filter that coincide with transmissive portions of the transflector have a stronger color filtering effect than portions of the color filter that coincide with reflective portions of the transflector. As described above, this facilitates balancing of the color saturation between reflective and transmissive mode. Combining color filter adjustments and reflectivity adjustments for the sub-pixels of each color provides an alternative measure for balancing and optimizing the color and white points.

The different filtering effect may, for example be provided for using a color filter that has differing filtering density. However, in many applications, it is easier to use a differentiated filter thickness instead. This is particularly advantageous in case the color filter is arranged directly on the transflector, since the holes forming transmissive portions, which typically requires a stronger filtering effect, define cavities that may accommodate the extra filter thickness. Thereby the outer filter surface, that faces the layer of liquid crystal, may be made more even. Hence, according to one embodiment, the color filter is arranged directly on the transflector, and portions of the color filter that coincide with transmissive portions of the transflector are thicker than portions of the color filter that coincide with the reflector surface of the transflector.

Furthermore, the color filter thickness, and hence also the color filter effect, can be selected different for reflective portions of different colors. Thus, according to one embodiment, the thickness of the color filter in portions that coincide with the reflective portions differs between sub-pixels of different colors.

Adjusting the reflectivity of the non-transmissive portions of the transflector, in line with the present invention, may also be combined with a pinhole color filter (i.e. a color filter that has holes in it and thus does not filter all impinging ambient light, resulting in a combination of filtered and unfiltered light and hence in degradation of the color saturation). Hence, according to one embodiment, the color filter is arranged such that it coincides with parts, but not all, of the reflector surface. Obviously, in case the light absorbance is adjusted by incorporation of totally absorbing portions, the existence of a color filter in the absorbing portions is irrelevant for the display performance. However, according to this embodiment, the color filter is arranged such that it leaves some of the reflected ambient light unfiltered. A sub-pixel having a pinhole color filter will thus display a light spectrum that comprises unfiltered as well as filtered light in the reflective mode.

BRIEF DESCRIPTION OF THE DRAWINGS

Embodiments of the present invention will now be further described with reference to the accompanying, exemplifying drawings on which:

FIG. 3 illustrates the transflector of FIG. 2 in transmissive mode.

FIG. 4 illustrates the transflector of FIG. 2 in reflective mode.

FIG. 5 illustrates top views and cross sections of a "slit type" transflector in accordance with the present invention, in different stages of manufacturing.

FIG. 6 illustrates the transflector of FIG. 5 in transmissive mode.

FIG. 7 illustrates the transflector of FIG. 5 in reflective mode.

DETAILED DESCRIPTION OF EMBODIMENTS OF THE INVENTION

Figure 1:
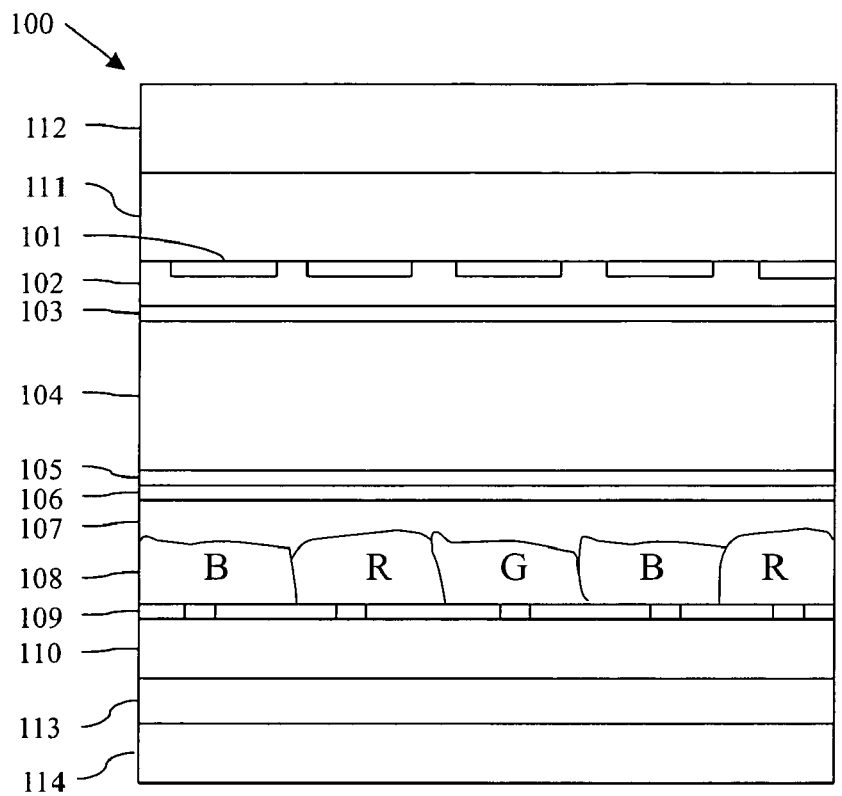
FIG. 1 illustrates a transflective liquid crystal display.

For explanatory reasons, FIG. 1 illustrates a cross-section of a transflective liquid crystal display 100. As is commonly known in the art, transflective displays may have many different designs, and this example only serves as illustrative example. The display 100 comprises a front side substrate 111 and a backside substrate 110. On the front side substrate 111, electrodes 101 are formed in a striped pattern, defining rows (or columns) of sub-pixels. The electrodes are typically formed out of ITO (Indium Tin Oxide), and are covered by a topcoat 102 serving as an adhesion and insulation layer. On the topcoat 102, a rubbing layer 103 is arranged. The rubbing layer 103 may be formed out of, for example, rubbed polyimide.

The backside substrate 110 carries a transflector 109, which typically is a patterned layer of reflecting material that defines reflecting portions and transmissive portions on the backside substrate 110. The transflector 109 is covered with a structured color filter 108 that has a sub-pixel pattern, which coincides with the pattern of the electrodes. The color filter 108 can be covered with a transparent overcoat in order to provide a smooth surface for the row (or column) electrodes 106 that are arranged thereon. The row electrodes 106 are covered with a rubbing layer 105, that together with rubbing layer 103 forms a cavity, which is filled with a layer of liquid crystal 104.

The display further comprises an optical front stack 112 and an optical rear stack 113 (polarizers etc.) and a backlight arrangement 114. The backlight arrangement is operative to emit light through the transmissive portions of the transflector.

The remainder of this description will be focused on the portion of the display that carries the color filter and the transflector, since this typically is where the characteristics of the present invention reside. As a matter of course, components not discussed in the following may be designed and manufactured according to any way known or yet to come.

Figure 2:
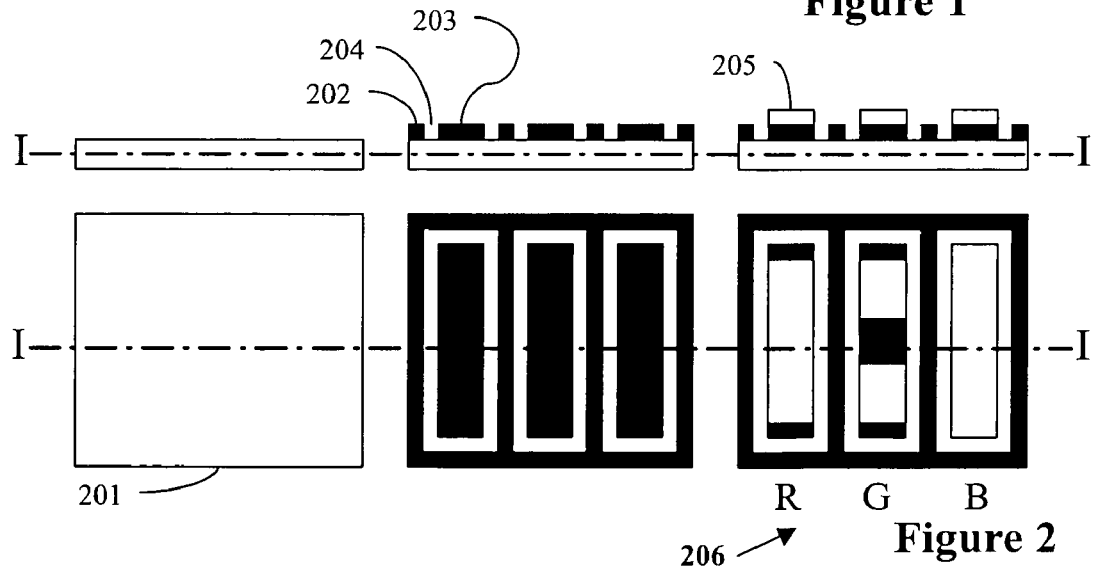
FIG. 2 illustrates top views and cross sections of an "island type" transflector according in accordance with the present invention, in different stages of manufacturing.

Hence, FIG. 2 illustrates a top view and a cross section of a glass plate 201 that forms the base for a transflector in accordance with the present invention. To this end the glass plate 201 is covered with a black, light absorbing material. The material may, for example, be printed using a printing technique or may be made by spin coating and subsequent mask exposure and development, and forms a pattern consisting of a black matrix 202 and black islands 203 that are separated from the matrix by a uncovered frame 204. Each frame 204 and island 203 together forms a sub-pixel area where the non-covered frame defines the transmissive portion and the covered island defines a non-transmissive portion. Thereafter a layer of reflective material 205 is arranged on parts of the islands. The reflective material thus forms a reflective surface on the non-transmissive portions. The sub-pixels shown in this example are a red (R), green (G), and a blue (B) sub-pixel, that together form a full-color pixel 206. The actual colors are provided by a color filter that is not shown in this figure. In this example, the non-transmissive portion of the blue pixel is fully covered with reflective material, giving it maximum reflectivity. The red sub-pixel has a somewhat reduced reflectivity and the green sub-pixel has its reflector surface divided into two separate areas, together covering about half of the non-transmissive portion.

FIG. 3 illustrates the pixel 206 in transmissive mode, when the backlight is turned on and no ambient light contributes to the display. The pixel thus emits light from the transmissive portions 204 only, which are white in this figure. The black portions, on the other hand, do not emit any light and, consequently, do not contribute to the displayed image. FIG. 4, on the other hand, illustrates the pixel in reflective mode, when the backlight is turned off and ambient light is strong enough to form a visible image. The ambient light is thus reflected by the reflector surfaces 205 only, and therefore only parts of the non-transmissive portions contribute to the overall image.

When viewing the display at a distance, the perceived image will be formed by the total light that is emitted from each pixel, and the splitting of the area into sub-pixels and emitting and non-emitting portions will be imperceptible. However, under any given circumstance, the larger the emitting areas are, the more light will be emitted and, consequently, the brighter the displayed image will be.

FIG. 5 illustrates a transflector design that differs from the "island type" shown in FIG. 2. In the transflector shown in FIG. 5, the glass plate 501 is covered with a light absorbing material that forms a black matrix 502 (as in FIG. 2) and light-absorbing slits 503 that are separated by transmissive slits 509. The slits are subsequently covered with reflecting material 505, in the form of slits having different widths. The resulting transmissive and reflective appearance is illustrated in FIGS. 6 and 7, respectively.

Figure 8:
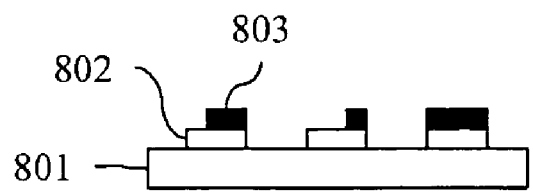
FIG. 8 illustrates a cross section of an alternative transflector design in accordance with the present invention.

FIG. 8 illustrates an alternative way of arranging the non-reflecting areas of 10 the non-transmissive portions on a transflector. FIG. 8 thus shows a cross section of a transflector 800 comprising reflective material 802 that is arranged directly on a glass plate 801. The light-absorbing material 803 is arranged on the reflector material instead of being arranged between the reflecting material and the glass substrate. This particular transflector 800 has a striped transflector design, and does not carry any black matrix. However, it should be realized that the light absorbing material may be arranged in any spatial relationship with the reflector surface, and that any transflector layout may be used in combination with the present invention.

A general advantage using the present intention is that no extra process steps are needed, as the reflector already will be processed to make the hole for the transmissive performance.

Figure 9:
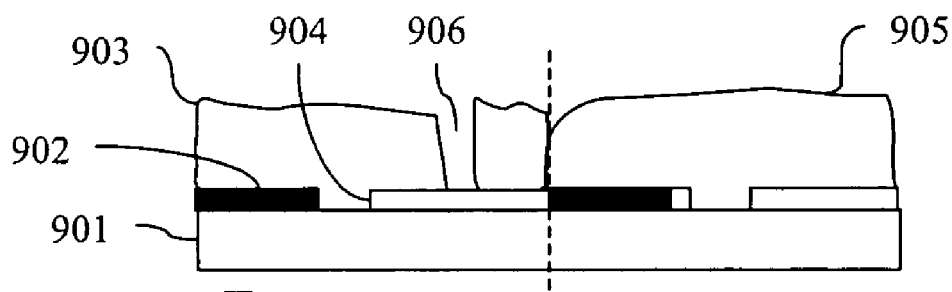
FIG. 9 illustrates a cross section of a transflector and color filter in accordance with the present invention, wherein a pinhole type color filter is used.

As stated above, the color filter may have a so-called pinhole structure. Such a transflector 900 is illustrated in FIG. 9, where reference number 901 refers to a glass plate, reference number 902 refers to a light absorbing portion and 904 refers to a reflective portion of the transflector. Reference numbers 903 and 905 refers to portions of a color filter that have different colors (i.e. that are associated with different sub-pixels). Portion 903 of the color filter has a hole 906 through it that allows unfiltered light to be reflected by the reflector and to desaturate the color of the reflected light.

The transmissive white point can be controlled by individually selecting the reflection/transmission ratio for each color. Increasing the reflection/transmission ratio will, of course, reduce the brightness of that particular color in transmissive mode. However, such an increase will increase the brightness of that color in the reflective mode, and will thus have a complementary effect on the reflective white point. In case a pinhole color filter is employed; this complementary effect can be compensated for by suitable choice of reflective area in the non-transmissive portion.

Figure 10:
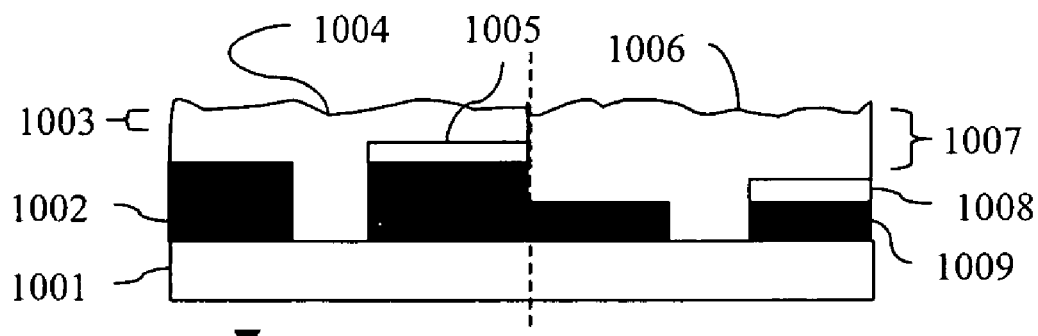
FIG. 10 illustrates a cross section of a transflector and color filter in accordance with the present invention, wherein the color filter has different thickness in transmissive and reflective portions as well as in reflective portions of different colors.

Alternatively, as illustrated in FIG. 10, the color filter may have different thickness in the transmissive and the non-transmissive portions of the transflector. The transflector 1000 illustrated in FIG. 10 comprises a glass plate 1001, light absorbing material 1002, 1009, a reflector surface 1005, 1008, and a color filter 1004, 1006. The absorbing material covers the entire non-transmissive portion of the transflector, and is only partially covered by reflecting material. The color filter 1004, 1006 is arranged directly on the absorbing/reflecting material, as well as on the glass plate 1001. The color filter thus fills the gaps at the transmissive portions of the transflector. Consequently, the filtering effect is stronger in the transmissive portions than in the reflective portions. Furthermore, the absorbing material 1002 has different thickness in the two sub-pixels, making the left color filter 1004 thinner than the right color filter 1006 (compare thickness 1003 in the left sub-pixel with thickness 1007 in the right sub-pixel). In effect, the filtering effect differs not only between the transmissive and the non-transmissive portions but also between the non-transmissive portions of sub-pixels of different colors. Thereby it is possible to balance and optimize the reflective color adjusting the color filter thickness (mainly affecting the saturation level for reflected light) and by the area of the reflective material (mainly affecting the brightness of reflected light). In addition, of course, the color saturation of transmitted light is enhanced due to the generally thicker color filter.

Color filters having a patterned thickness (i.e. MT structures) have an advantage compared to the pinhole type in that, at equal reflective color saturation, the reflectance will be higher. This higher reflection rate can be used for optimization of white color point.

Figure 11:
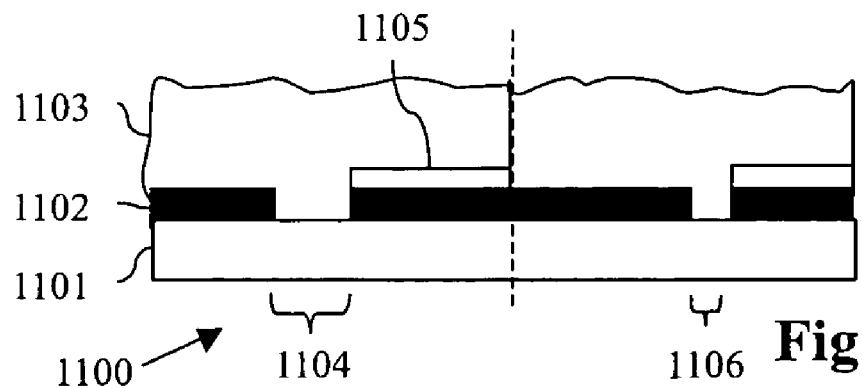
FIG. 11 illustrates a cross section of a transflector and color filter in accordance with the present invention, wherein the reflection/transmission ratio is different between sub-pixels of different colors.

FIG. 11 illustrates still one envisaged combination of color point optimization parameters. Similar to the above, the transflector of FIG. 11 comprises a glass plate 1101, light absorbing material 1102, reflecting material 1105 and a color filter 1103. However, here the reflection/transmission ratio of the transflector is selected differently for sub-pixels of different colors. Thus, the left sub-pixel has an opening 1004 that is wider than the opening 1006 in the right pixel.

The above measures can all be provided, for example, using printing techniques. Alternatively, or in combination, the different patterns may be provided using a mask step. The respective material may then be applied across the entire surface of the transflector (for example by spin-coating or roller-coating), and areas to be removed may then be exposed for electromagnetic radiation through a mask and subsequently etched. In particular, in case absorbing material of different thickness is desired, a half-tone mask may be employed. With such a mask, different areas may be exposed to different amounts of radiation. In the subsequent etching, the surface will be removed in relation to the amount of received radiation. Thereby it is possible pattern the surface with areas of different thickness.

In case a pinhole color filter is employed, the color saturation balance between transmissive and reflective mode will typically be determined mainly by the pinhole configuration. Pinhole color filters are advantageous in that they provide for more versatile adjustment of the respective color points, without reducing the reflectivity. However, pinhole color filters are typically difficult to manufacture using an additive method (such as a printing technique). In fact, pinhole color filters generally require a subtractive patterning method, such as spin coating or roller coating and a subsequent masking step.

In case a color filter having different thickness in the transmissive and the non-transmissive portions is employed (so-called Multiple Thickness filters, MT filters), the color saturation balance between transmissive and reflecting light will mainly be determined by the selected thickness of the color filter. MT filters are advantageous in that they are readily provided for using additive methods, such as a printing technique. Using a printing technique, almost 100% of the pigment needed will be used for making up the color filter. Using subtractive methods, there will always be a substantial waste of pigment. For example, about 95% will be wasted using spin coating and about 70% will be wasted using roller coating. Pigment is a major cost driver when manufacturing the color filter. Consequently, MT filter are substantially cheaper to manufacture than pinhole filters. In fact, the present invention is particularly advantageous in combination with MT color filters, since this combination provides a cost effective design that enables separate color and white point optimization of the transmissive as well as the reflective mode.

The present invention is thus based on the use of hole-in-mirror transflectors that are not fully reflective in their non-transmissive portions. The ratio between reflective and non-reflective portions of the non-transmissive portions is selected so as to balance the white point and the color point of reflected light with the white and color point of light that is transmitted from the backlight. In effect, the invention provides a convenient and cost effective way of tuning the reflective white point.

However, a complicating factor when optimizing the color points is that the contrast in the pixels is finite. In other words, even in their off-state, the sub-pixels will transmit/reflect a certain amount of light. Consequently, this light will always be present in the displayed image, and it will thus interfere with and desaturate the color points of the other sub-pixels. As a result, changing the size of the reflective surface for sub-pixels of a particular color will, in fact, affect also the color saturation, and thus the color points, of reflected light since the reflective surface determines the amount of light that is reflected also for pixels that are turned off. For example, in a RGB display, in case red light is desired, the blue and the green sub-pixels are turned off. However, due to the finite contrast, the blue as well as the green sub-pixel will still add some light and will thus desaturate the red light. But, in case the reflective surface of the blue and/or the green sub-pixels are reduced, the desaturating effect will of course decrease in a corresponding degree.

One way of interpreting the invention is that the transflector is arranged not only with reflective and transmissive portions, but also with light absorbing portions. Thereby it is possible to separately control the brightness in the transmissive and reflective modes. Basically, the invention can be provided for by simply changing the pattern of the already patterned reflective material.

In essence, the present invention relates to transflective color liquid crystal displays that provide for improved balancing and optimization of color and white points in transmissive and reflective mode. The invention is base on the deliberate increase of light absorbance at sub-pixels of selected colors. The light absorbance can be increased by the inclusion of light absorbing portions 803 at sub-pixel level, which then reduces the total reflectivity and/or transmittivity of that sub-pixel. Selecting the light absorbance in accordance with the present invention may be combined with the use of color filters having differentiated thickness and/or pinhole color filters.

The invention claimed is:

1. A transflective liquid crystal display comprising:
 a plurality of pixels each comprising sub-pixels corresponding to different colors;
 a color filter that is patterned in correspondence with said sub-pixels, and
 a transflector having sub-pixel portions aligned with corresponding sub-pixels of the display and comprising light absorbing portions, wherein sub-pixel portions corresponding to different colors have mutually different light absorption ratios, and wherein the sub-pixel portions in the transflector corresponding to different colors have mutually different light absorption ratios independent of the color filter.

2. A transflective liquid crystal display according to claim 1, wherein the transflector has light absorbing portions arranged at sub-pixels portions corresponding to more than one color.

3. A transflective liquid crystal display comprising:
 a plurality of pixels each comprising sub-pixels corresponding to different colors;
 a color filter that is patterned in correspondence with said sub-pixels;
 a transflector having sub-pixel portions aligned with corresponding sub-pixels of the display and comprising light absorbing portions, wherein sub-pixel portions corresponding to different colors have mutually different light absorption ratios; and
 a black matrix that separates the sub-pixels from each other, wherein said black matrix is formed on said transflector and includes the same material as said light absorbing portions.

4. A transflective liquid crystal display according to claim 1, wherein each sub-pixel portion has a transmissive portion and a reflective portion.

5. A transflective liquid crystal display according to claim 4, wherein an area ratio between transmissive and reflective portions of the transflector is different between sub-pixels of different colors.

6. A transflective liquid crystal display according to claim 4, wherein first portions of the color filter associated with transmissive portions of the transflector have a stronger color filtering effect than second portions of the color filter associated with reflective portions of the transflector.

7. A transflective liquid crystal display according to claim 6, wherein the color filter and the transflector are arranged directly adjacent each other, and the first portions of the color filter are thicker than the second portions of the color filter.

8. A transflective liquid crystal display comprising:
 a plurality of pixels each comprising sub-pixels corresponding to different colors;
 a color filter that is patterned in correspondence with said sub-pixels; and
 a transflector having sub-pixel portions aligned with corresponding sub-pixels of the display and comprising light absorbing portions, wherein sub-pixel portions corresponding to different colors have mutually different light absorption ratios,
 wherein the thickness of the color filter in portions that coincide with reflective portions differs between sub-pixels of different colors.

9. A transflective liquid crystal display according to claim 1, wherein the color filter is arranged such that it coincides with parts of the reflective portions of the transflector.

10. A transflective liquid crystal display according to claim 3, wherein the transflector has light absorbing portions arranged at sub-pixels portions corresponding to more than one color.

11. A transflective liquid crystal display according to claim 3, wherein the sub-pixel portions in the transflector corresponding to different colors have mutually different light absorption ratios independent of the color filter.

12. A transflective liquid crystal display according to claim 3, wherein each sub-pixel portion has a transmissive portion and a reflective portion.

13. A transflective liquid crystal display according to claim 12, wherein an area ratio between transmissive and reflective portions of the transflector is different between sub-pixels of different colors.

14. A transflective liquid crystal display according to claim 12, wherein first portions of the color filter associated with transmissive portions of the transflector have a stronger color filtering effect than second portions of the color filter associated with reflective portions of the transflector.

15. A transflective liquid crystal display according to claim 14, wherein the color filter and the transflector are arranged directly adjacent each other, and the first portions of the color filter are thicker than the second portions of the color filter.

16. A transflective liquid crystal display according to claim 3, wherein the color filter is arranged such that it coincides with parts of the reflective portions of the transflector.

17. A transflective liquid crystal display according to claim 8, wherein the sub-pixel portions in the transflector corresponding to different colors have mutually different light absorption ratios independent of the color filter.

18. A transflective liquid crystal display according to claim 8, wherein each sub-pixel portion has a transmissive portion and a reflective portion, and wherein an area ratio between transmissive and reflective portions of the transflector is different between sub-pixels of different colors.

19. A transflective liquid crystal display according to claim 8, wherein each sub-pixel portion has a transmissive portion and a reflective portion, and wherein first portions of the color filter associated with transmissive portions of the transflector have a stronger color filtering effect than second portions of the color filter associated with reflective portions of the transflector.

20. A transflective liquid crystal display according to claim 8, further comprising a black matrix that separates the sub-pixels from each other, wherein said black matrix is formed on said transflector and includes the same material as said light absorbing portions.

* * * * *